United States Patent [19]

Shimizu

[11] 4,253,179
[45] Feb. 24, 1981

[54] TIME DIVISION DIGITAL SWITCHING SYSTEM WITH CODE CONVERTING AND INVERSE-CONVERTING CIRCUITS

[75] Inventor: Hiroshi Shimizu, Tokyo, Japan

[73] Assignee: Nippon Electric Co., Ltd., Tokyo, Japan

[21] Appl. No.: 930,271

[22] Filed: Aug. 2, 1978

[30] Foreign Application Priority Data

| Aug. 17, 1977 | [JP] | Japan | 52-98941 |
| Aug. 17, 1977 | [JP] | Japan | 52-98942 |
| Aug. 17, 1977 | [JP] | Japan | 52-98943 |
| Aug. 17, 1977 | [JP] | Japan | 52-98944 |
| Aug. 17, 1977 | [JP] | Japan | 52-98945 |
| Aug. 31, 1977 | [JP] | Japan | 52-105309 |

[51] Int. Cl.³ .......................... H04J 6/00; H04Q 11/04
[52] U.S. Cl. ....................... 370/67; 370/85; 370/92
[58] Field of Search .......... 179/15 AL, 15 A, 15 AT, 179/15 BA; 370/67, 66, 85, 96, 95, 92, 91

[56] References Cited

U.S. PATENT DOCUMENTS

| 3,233,043 | 2/1966 | Shimasaki | 179/15 A |
| 3,627,951 | 12/1971 | Batin | 179/15 BA |
| 3,643,030 | 2/1972 | Sparrendahl | 179/15 BA |
| 3,787,627 | 1/1974 | Abramson et al. | 179/15 BA |
| 3,860,761 | 1/1975 | O'Neill, Jr. | 179/15 A X |
| 3,963,870 | 6/1976 | Couder et al. | 179/15 AT |
| 4,004,099 | 1/1977 | Jones et al. | 179/15 AL |
| 4,010,326 | 5/1977 | Schwartz | 179/15 BA |

*Primary Examiner*—Thomas W. Brown
*Attorney, Agent, or Firm*—Sughrue, Rothwell, Mion, Zinn and Macpeak

[57] ABSTRACT

A time division switching system for interconnecting two arbitrary terminals in a digital telephone switching system or a data communication system is disclosed. The system includes a code converting circuit which receives two digital signals transmitted from two line circuits participating in a communication and produces a third digital signal indicating the mutual relationship between the two digital signals. A common bus distributes the third digital signal to the respective line circuits each of which includes a code inverse-converting circuit. A control memory stores a plurality of address pairs, and control means allots one time slot to the two line circuits so that information is interchanged periodically between the two line circuits by an address pair obtained periodically from the control memory.

17 Claims, 31 Drawing Figures

TIME DIVISION DIGITAL SWITCHING SYSTEM WITH CODE CONVERTING AND INVERSE-CONVERTING CIRCUITS

BACKGROUND OF THE INVENTION

1. Field of the Invention

The present invention relates to a switching system for interconnecting two arbitrary terminals in a communication network, and more particularly to a time division digital switching system for use in a digital telephone switching system and in a data communication system.

The application of the present invention can be found in a communication network composed of a plurality of subsystems having a plurality of line circuits, for example, a plurality of telephones in the case of a telephone network or a plurality of computer terminals in the case of a data communication system.

2. Prior Art

For details of the time division digital telephone switching system, reference is made to the paper by G.L. Rainey and B.E. Voss entitled "SL-1: A Business Communications System with Digital Switching and Stored Program Control", CONFERENCE RECORD, on pages 432-1-1 through 432-1-6, of INTERNATIONAL SWITCHING SYMPOSIUM held Oct. 25 to Oct. 29, 1976, in Japan (Reference 1). In particular, in the telephone switching system shown in FIG. 4 of Reference 1, an outgoing path and an incoming path are separated in space in order to perform an encoded speech transmission between subscribers X and Y, and different time slots TS14 and TS15 are allotted to the subscribers so as to perform time division communication.

On the other hand, the configuration shown in FIG. 2 in the paper by A. Mack and B. Patrusky entitled "Time Division Digital Switch Matrix Technique Evaluation", CONFERENCE RECORD, on pages 40-1 through 40-7, of IEEE INTERNATIONAL CONFERENCE ON COMMUNICATIONS (June 19-21, 1972) is known as an example wherein the time division communication between the above-mentioned subscribers is performed through one interhighway without separating in space the outgoing path from the incoming path.

In this configuration, however, two time slots are used for the transmission and the reception, separately, of the communication between the subscribers.

In these prior art systems, the degree of multiplexing of communications, i.e., the maximum number of connections of connecting two arbitrary subscribers with each other simultaneously is half the number of time slots in a communication path, and consequently these systems are not advantageous in terms of the efficiency of multiplexing.

SUMMARY OF THE INVENTION

An object of this invention is therefore to provide a time division digital switching system in which only one time slot is allotted with respect to one communication in the case where subscribers participating in the communication are connected to the same common bus while allowing the degree of multiplexing of communications to become equal to that of communication paths.

The present system comprises a code converting circuit for receiving two digital signals transmitted from two line circuits participating in one communication and for producing a third digital signal indicating the mutual relationship between said two digital signals, a common bus for distributing said third digital signal from said code converting circuit to the respective line circuits, a control memory for storing a plurality of address pairs with respect to said two line circuits participating in said communication, control means for allotting one time slot to said two line circuits so that information is interchanged periodically between said two line circuits participating in said communication by an address pair obtained periodically from said control memory, and a code inverse-converting circuit provided in said respective line circuits and receiving said third digital signal distributed from said code converting circuit and the digital signal given from the own line circuit for reproducing the digital signal relating to the line circuit on the other side.

BRIEF DESCRIPTION OF THE DRAWINGS

The present invention will now be described in greater detail in conjunction with the accompanying drawings, in which.

DESCRIPTION OF THE PREFERRED EMBODIMENTS

Figure 1:
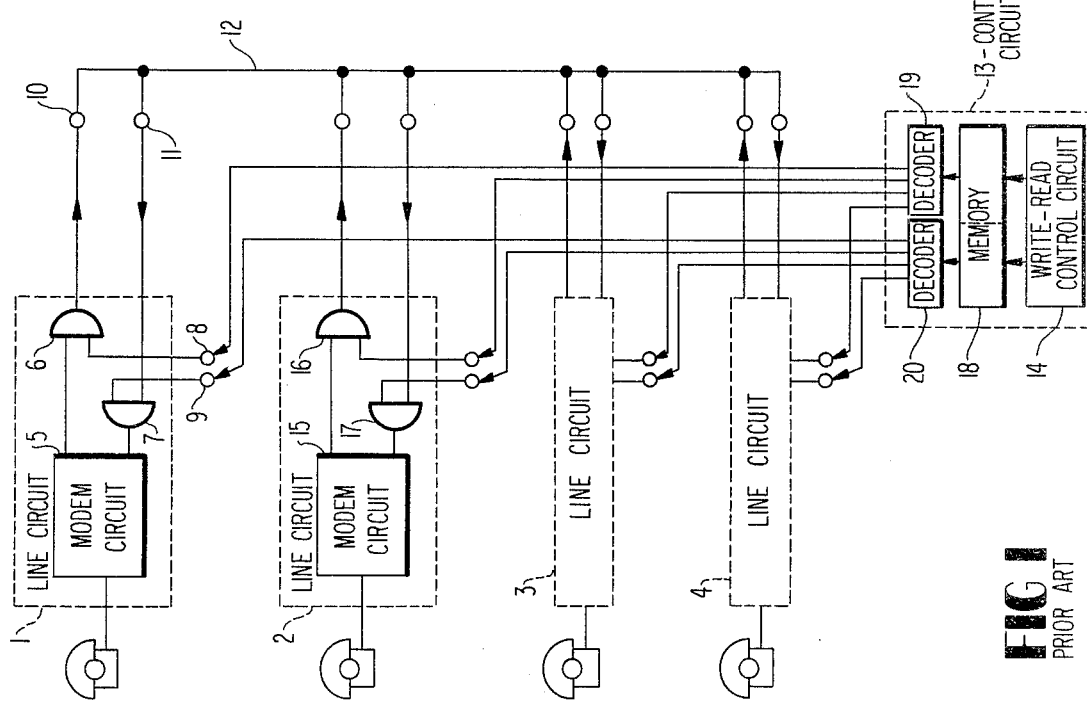
FIG. 1 is a block diagram of a prior art system.

Referring to FIG. 1, the digital switching system of the prior art disclosed in Reference 2 is illustrated in more detail. This system includes line circuits 1, 2, 3 and 4, a common bus 12 for coupling all of the output and input terminals of the line circuits 1, 2, 3 and 4, transmitting gates 6 and 16 of the line circuits 1 and 2, receiving gates 7 and 17 of the line circuits 1 and 2 and a control unit 13 for controlling the opening and closing of these gates 6, 7, 16 and 17. In FIG. 1, the details of the line circuits 3 and 4 are omitted, but these circuits 3 and 4 also have the transmitting and receiving gates, similarly.

Also, said line circuit is a circuit provided to the corresponding subscriber and serving for the reception and transmission of a digital signal on the time division basis. In the case of a telephone switching system, the line circuit is a circuit wherein an analog two-wire signal is converted into an analog four-wire signal, subjected to the frequency band restriction, and converted into a digital signal to be outputed, and also wherein a received digital signal is converted into an analog four-wire signal, and converted into an analog two-wire signal to be transmitted to a subscriber. On the other hand, in the case of a data communication system, the line circuit means a circuit in which a data signal transmitted from a terminal equipment of a subscriber on the transmitting side is converted into a predetermined digital signal to be outputed, and also in which a received digital signal is subjected to an inverse conversion and converted into a data signal to be transmitted to a terminal equipment of a subscriber on the receiving side.

The line circuit 1 has a modem circuit 5 for converting the signal given from the subscriber into the digital signal and for reproducing an original signal from the received digital signal, the transmitting gate 6 having one input terminal connected to the output terminal of the modem circuit 5 and an output terminal connected to a terminal 10, and the receiving gate 7 having one input terminal connected to a terminal 11 and an output terminal connected to the input terminal of the modem circuit 5. The other line circuits 2, 3 and 4 also have the same arrangements, respectively. The control circuit 13 has a control memory 18 for storing addresses of two line circuits in two sections having address positions corresponding to time slots, respectively and for reading out the content thus stored periodically, a write-read control circuit 14 for controlling the read-out and write-in operations of this control memory 18, and decoders 19 and 20 for decoding the outputs given from the control memory 18 by the unit of the above-mentioned section and for transmitting the decoded outputs as a control signal to the terminals such as the terminals 8 and 9 of the respective line circuits.

Description will now be made of the communication between the line circuits 1 and 2. The read-write control circuit 14 in the control unit 13 operates in such a way that the addresses of the line circuits 1 and 2 are written in a first section and a second section having address positions corresponding to the time slot $T_1$ in the control memory 18 and the addresses of the line circuits 2 and 1 are written in two sections having address positions corresponding to the other time slot $T_2$, and that the contents of the control memory 18 are read out periodically. The decoders 19 and 20 decode the outputs sent from the two sections in the control memory 18 and transmit control signals to the transmitting gate 6 of the line circuit 1 and to the receiving gate 17 of the line circuit 2 at the time slot $T_1$, and to the receiving gate 7 of the line circuit 1 and to the transmitting gate 16 of the line circuit 2 at the time slot $T_2$.

In the line circuit 1, the control signal is supplied to the input terminal 8 of the transmitting gate 6 at the time slot $T_1$ so as to transmit the digital signal to the common bus 12. In the line circuit 2, the control signal is given to the input terminal of the receiving gate 17 at the time slot $T_1$ to receive the digital signal transmitted from the circuit 1. On the other hand, the transmitting gate 16 of the line circuit 2 and the receiving gate 7 of the line circuit 1 are opened respectively at the time slot. $T_2$ in a similar way so that the digital signal given from the line circuit 2 is received by the line circuit 1. In this way, two time slots are used for one bidirectional communication in the prior art system, and accordingly, the degree of multiplexing of communications is half that of the communication paths.

A first embodiment of this invention will be described referring to FIGS. 2, 3 and 4, hereinafter. The present system of FIG. 2 has line circuits 101, 102, 103 and 104, a code converting circuit 105, a common bus 113 and a control unit 118. The control unit 118 has a write-read control circuit 114, a control memory 115 and decoders 116 and 117.

Figure 2:
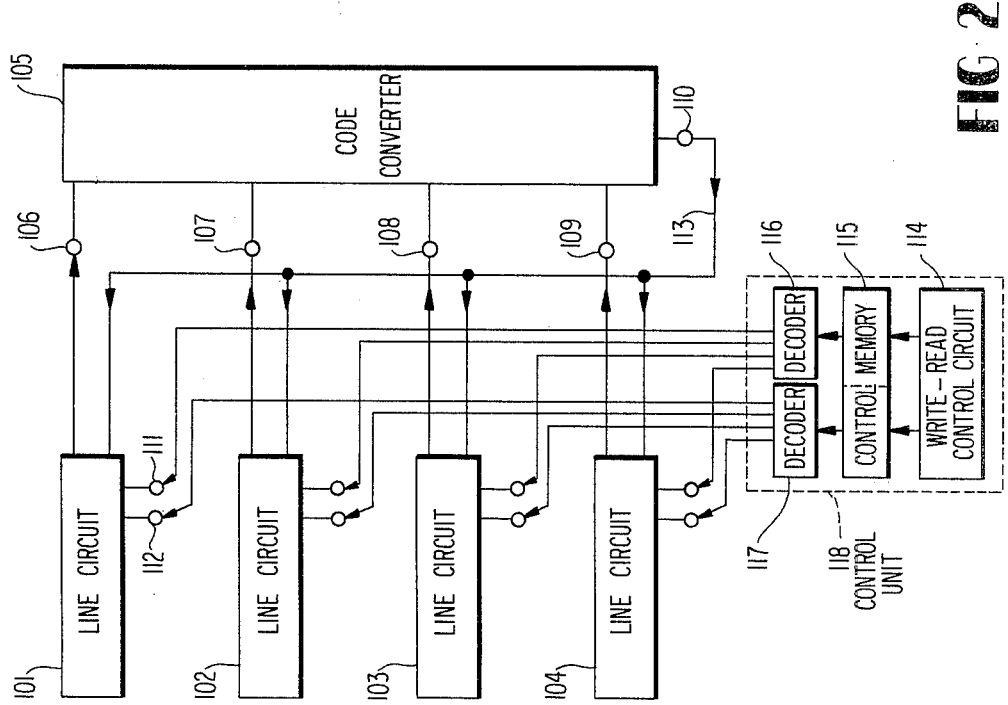
FIG. 2 is a block diagram of a first embodiment of the present invention.
Figure 3:
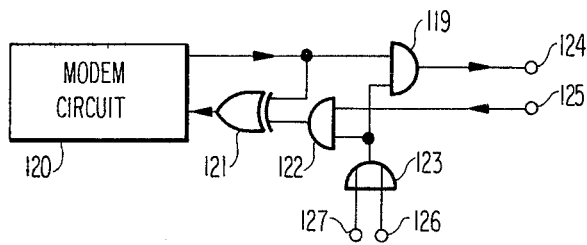
FIG. 3 is a logic diagram of a line circuit of the first embodiment.
Figure 4:
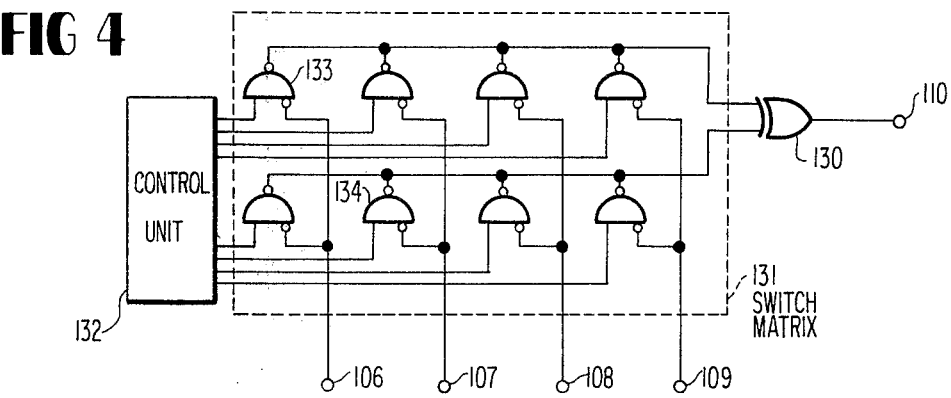
FIG. 4 is a logic diagram of a code converting circuit of the first embodiment.

FIGS. 3 and 4 show the details of the line circuits 101~104 and the code converting circuit 105 of this embodiment, respectively. The line circuit of FIG. 3 has a modem circuit 120 having the same function and configuration as the modem circuit 5 or 15 of the line circuit shown in FIG. 1, a transmitting gate 119, a receiving gate 122, a code inverse-converting circuit composed of an Exclusive OR circuit 121, and an OR gate 123. A terminal 124 of FIG. 3 is connected to one of input terminals 106–109 of the code converting circuit 105 of FIG. 2. A terminal 125 is connected commonly to the output terminal 110 of the code converting circuit 105 through the common bus 113. Terminals 126 and 127 of FIG. 3 correspond respectively to terminals 111 and 112 of FIG. 2 and are connected to the output terminals of the decoders 116 and 117.

The code converting circuit of FIG. 4 has an Exclusive OR circuit 130, a switch matrix 131 and a control unit 132 similar to the control unit 118 of FIG. 2. Gates such as gates 133 and 134 forming the switch matrix 131 may be made of open collector (or tristate) gates which produce the digital signal given from the terminal 106–109 when the control signal is transmitted from the control unit 132 and which produce the logical level "1"(or assume an open condition in the case of the tri-state gates) when the control signal is not transmitted from the control unit 132.

Next, the communication between the line circuits 101 and 102 will be described in this embodiment. The control circuit 114 of the control unit 118 controls the control memory 115 in such a manner that the addresses of the line circuits 101 and 102 are written in the first and second sections having address positions corresponding to a time slot T in the control memory 115 and the contents of this control memory 115 are read out periodically. In this case, the decoders 116 and 117 decode the outputs given from the two sections in the control memory 115, respectively, and transmit the control signals to the line circuits 101 and 102 at the time slot T. In the line circuits 101 and 102, the control signals are sent to the terminals 127 and 126 of FIG. 3, respectively, and then given to the transmitting gate 119 and the receiving gate 122 through the OR gate 123, respectively. The transmitting gates 119 of the line circuits 101 and 102 are in the open condition simultaneously at the time slot T and produce respective digital signals A and B at the terminals 124, respectively. In the code converting circuit 105, only the gates 133 and 134 of the switch matrix 131 are opened and the digital signals A and B applied through the terminals 106 and 107 are sent to the Exclusive OR circuit 130. The Exclusive OR circuit 130 produces at its output terminal 110 a digital signal $A \oplus B$ ($= A \cdot \bar{B} + \bar{A} \cdot B$). The digital signal $A \oplus B$ thus derived from the terminal 110 is distributed as a third digital signal C to the respective line circuits through the common bus 113. In the line circuits 101 and 102, the respective gates 122 are opened simultaneously at the time slot T and receive the digital signal C. In the line circuit 101, the digital signal C and its own digital signal A are given to the Exclusive OR circuit 121 to reproduce the digital signal B given from the line circuit 102 by the following operation;

$$A \oplus C = A \oplus (A \oplus B) = B$$

In other words, the Exclusive OR circuit 121 is a code inverse-converting circuit.

This reproduced signal from the Exclusive OR circuit 121 is given to the modem circuit 120. Also, the control unit 132 of FIG. 4 is identical to the control unit 118 of FIG. 2, and the gate controls of the line circuits 101–104 and the code converting circuit 105 may be performed by one control unit.

Figure 5:
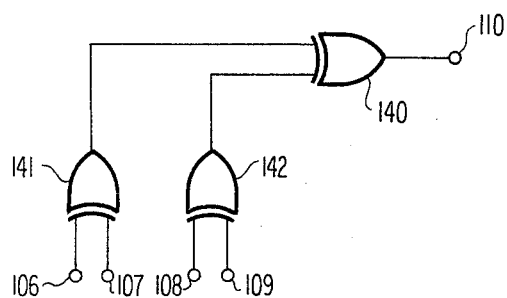
FIG. 5 is a logic diagram of another example of the code converting circuit of the first embodiment.

Referring to FIG. 5, another example of the code converting circuit 105 of this embodiment is composed of Exclusive OR circuits 140, 141 and 142. In this code converting circuit, the above-mentioned two digital signals A and B are supplied to the terminals 106 and 107 at the above-mentioned time slot T. In this case, the terminals 108 and 109 have the logical levels "0". The digital signal $A \oplus B$ is produced at the terminal 110. This digital signal $A \oplus B$ distributed as the third signal to the respective line circuits.

Figure 6:
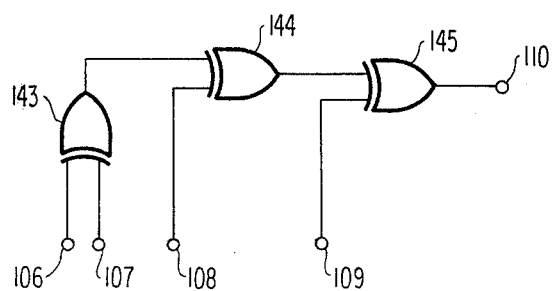
FIG. 6 is a logic diagram of a further example of the code converting circuit of the first embodiment.

A third example of the code converting circuit 105 is shown in FIG. 6 in which the code converting circuit is composed of Exclusive OR circuits 143, 144 and 145. The input terminals of the Exclusive OR circuit 143 are connected to the terminals 106 and 107. The input terminals of the Exclusive OR circuit 144 are connected to the output terminal of the Exclusive OR circuit 143 and the terminal 108. The input terminals of the Exclusive OR circuit 145 are connected to the output terminal of the Exclusive OR circuit 144 and the terminal 109. The output terminal of the Exclusive OR circuit 145 is connected to the terminal 110.

Figure 7:
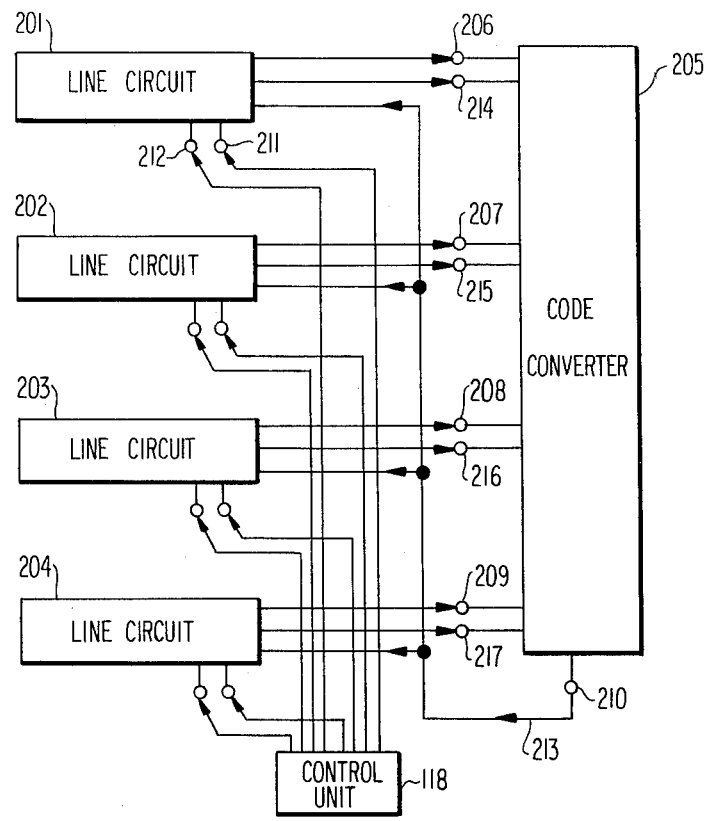
FIG. 7 is a block diagram of a second embodiment of the invention.

Now, a second embodiment will be described in conjunction with FIGS. 7, 8 and 9. Referring to FIG. 7, this embodiment has line circuits 201, 202, 203 and 204, input terminals 206–209 and 214–217 connected respectively to the first and second output terminals of these line circuits, a code converting circuit 205 having an output terminal 210, a common bus 213 for connecting the output terminal 210 with the input terminals of the respective line circuits, and a control unit 118.

Figure 8:
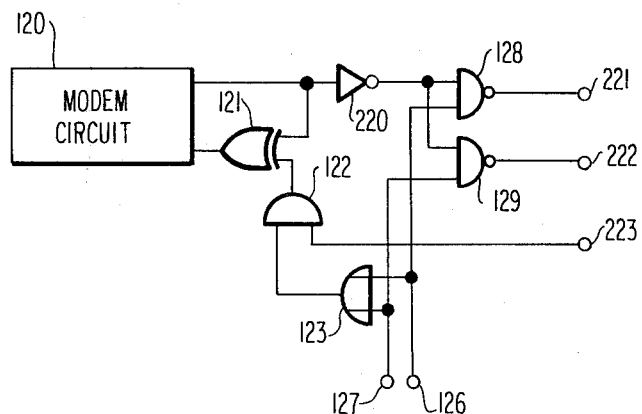
FIG. 8 is a logic diagram of a line circuit of the second embodiment.
Figure 9:
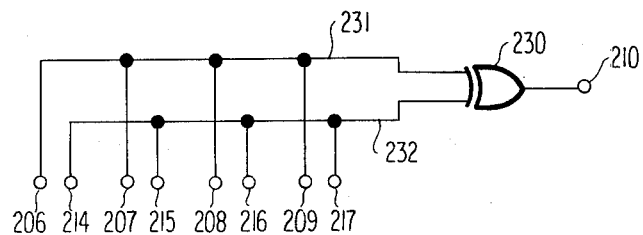
FIG. 9 is a logic diagram of a code converting circuit of the second embodiment.

FIGS. 8 and 9 show the details of the line circuits 201–204 and the code converting circuit 205 of this embodiment, respectively. The line circuit shown in FIG. 8 has the modem circuit 120, the Exclusive OR circuit 121, the receiving gate 122, the OR gate 123, a first transmitting NAND gate 128 and a second transmitting NAND gate, 129, both consisting of an open collector (or tristate) gate and an inverter 220. A terminal 221 of FIG. 8 corresponds to the terminals 206–209 of FIG. 7. A terminal 222 of FIG. 8 corresponds to the terminals 214~217. The terminals 126 and 127 correspond to the terminals 211 and 212, respectively. A terminal 223 is connected to the common bus 213.

The code converting circuit of FIG. 9 has an Exclusive OR circuit 230, and a first bus 231 and a second bus 232 which connect the two input terminals of the Exclusive OR circuit 230 with the terminals 206–209 and the terminals 214–217 in common, respectively.

Description will be made of the communication between the line circuits 201 and 202 in this embodiment.

Similarly to the first embodiment, the control signals are given to the terminals 126 of the respective line circuits 201 and the terminals 127 of the line circuit 202 at the time slot T. The signal A from the modem circuit 120 is sent through the inverter 220 to the transmitting NAND gate 128. This digital signal A is supplied to the terminal 206 of the code converting circuit 205. In a similar way, the transmitting NAND gate 129 of the line circuit 202 supplies the digital signal B to the terminal 215 of the code converting circuit 205. In this situation, the transmitting NAND gate 129 of the line circuit 201, the transmitting NAND gate 128 of the line circuit 202, and the transmitting NAND gates 129 and 128 of other line circuits assume the logical output "1". In FIG. 9, the code convering circuit 205 has a wired logic configuration so that the logical levels of the first and second bus 231 and 232 correspond to those of the digital signals A and B, respectively, which are given to the Exclusive OR circuit 230. The digital signal $A \oplus B$ is derived from the terminal 210 connected to the Exclusive OR circuit 230. This digital signal $A \oplus B$ thus given to the terminal 210 is distributed as the third digital signal C to the respective line circuits. In the line circuit 201, the above-mentioned control signal is fed to the receiving gate 122 through the OR gate 123 thereby opening the receiving gate 122. The Exclusive OR circuit 121 receives the digital signal C given from the receiving gate 122 at the time slot T and the digital transmitting signal A to reproduce the transmitting digital signal B ($= A \oplus C$) of the line circuit 202. The reproduced digital signal B is given to the modem circuit 120. The line circuit 202 also receives the digital signal C at the above-mentioned time slot T to reproduce the digital signal A of the line circuit 201.

Figure 10:
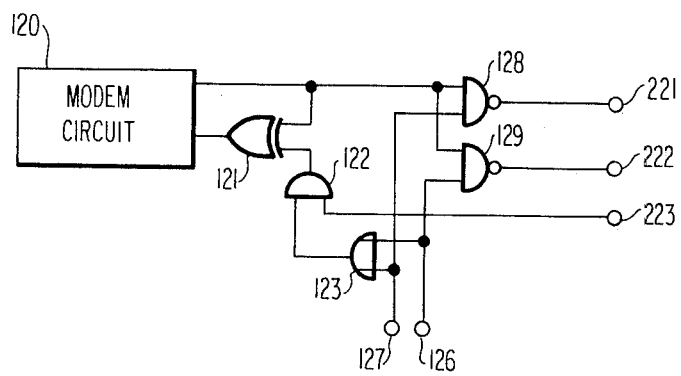
FIG. 10 is a logic diagram of another example of the line circuit of the second embodiment.

Referring to FIG. 10, another example of the line circuit of this embodiment has a similar structure to that of the line circuit of FIG. 8 other than the difference that the inverter 220 of FIG. 8 is removed and the output terminal of the modem 120 is connected directly to the one input terminal of each of the transmitting NAND gates 128 and 129. In a communication where the line circuit of FIG. 10 is used, the inverted signals $\overline{A}$ and $\overline{B}$ of the digital signal A and B are given to the terminals 206 and 215 at the above-mentioned time slot T. The Exclusive OR circuit 230 receives these digital signals $\overline{A}$ and $\overline{B}$ to form a digital signal $\overline{A} \oplus \overline{B}$ at the terminal 210. This digital signal $\overline{A} \oplus \overline{B}$ is equal to the above-mentioned digital signal C ($=A \oplus B$).

Figure 11:
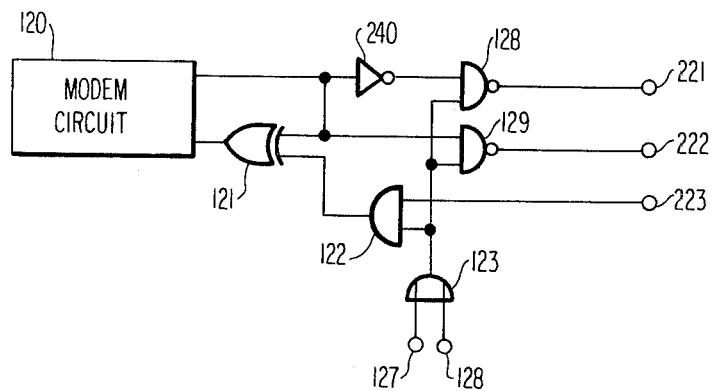
FIG. 11 is a logic diagram of a line circuit of a third embodiment of the invention.
Figure 12:
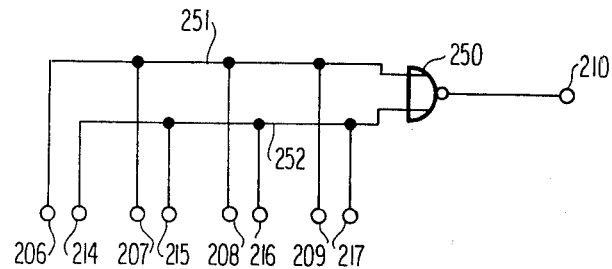
FIG. 12 is a logic diagram of a code converting circuit of the third embodiment.

Next, a third embodiment of this invention will be described referring to FIGS. 7, 11 and 12. FIGS. 11 and 12 show the details of the line circuits 201–204 and the code converting circuit 205 of this embodiment. The line circuit of FIG. 11 includes the modem circuit 120, the Exclusive OR circuit 121, the receiving gate 122, the OR gate 123, the two transmitting NAND gates 128 and 129 and an inverter 240. The code converting circuit of FIG. 12 is composed of a NOR gate 250, a first bus 251 and a second bus 252.

Description will be made of the communication between the line circuits 201 and 202 of FIG. 7 in the case of this embodiment. The transmitting NAND gates 128 and 129 of the line circuits 201 and 202 of FIG. 11 open at the time slot T in a manner similar to the first embodiment. In this case, the digital signals A and B are derived from the respective terminals 221. The inverted digital signals $\overline{A}$ and $\overline{B}$ relating to the digital signals A and B are obtained from the respective terminals 222. In the code converting circuit of FIG. 12, the digital signals A and B are supplied to the terminals 206 and 207, and the inverted digital signals $\overline{A}$ and $\overline{B}$ are given to the terminals 214 and 215, respectively. The logical level "1" is supplied to the terminals 208, 209, 216 and 217. As a result, the first and second buses assume the logical levels of logical products $A \cdot B$ and $\overline{A} \cdot \overline{B}$, respectively, since these terminals and buses are arranged to form a wired logic configuration. The NOR gate 250 receives these logical products $A \cdot B$ and $\overline{A} \cdot \overline{B}$ to produce a digital signal $A \oplus B$ ($= A \cdot \overline{B} + \overline{A} \cdot B$) at the terminal 210. This digital signal $A \oplus B$ is distributed as the third digital signal to the respective line circuits through the common bus 213. The line circuits 201 and 202 accept the third digital signal at the time slot T in a way similar to the first embodiment, thereby reproducing the digital signal transmitted from the line circuit on the other side, respectively.

Figure 13:
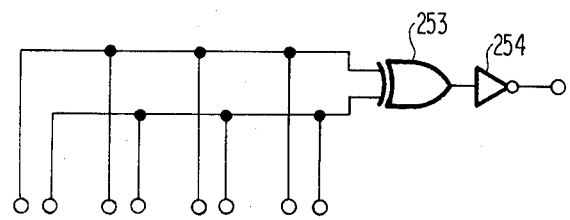
FIG. 13 is a logic diagram of another example of the code converting circuit of the third embodiment.

Referring to FIG. 13, another example of the code converting circuit of the third embodiment of this invention is arranged in such a way that the NOR gate 250 of FIG. 12 is replaced by an Exclusive OR circuit 253 and an inverter 254. The output logic in the case of the communication between the line circuits is $A \oplus B$ ($= A \cdot \overline{B} + \overline{A} \cdot B$). This logical output is identical to that obtained by the code converting circuit of FIG. 12.

Figure 14:
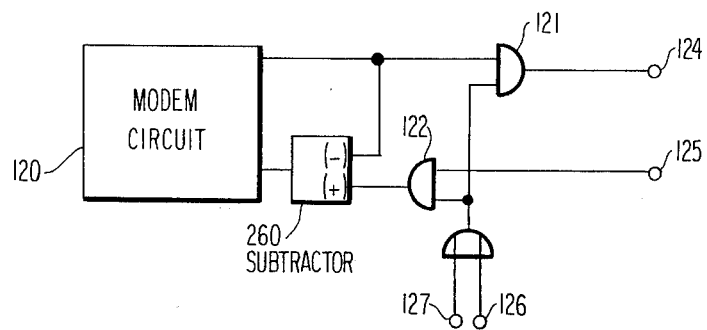
FIG. 14 is a logic diagram of a line circuit of a fourth embodiment of the invention.
Figure 15:
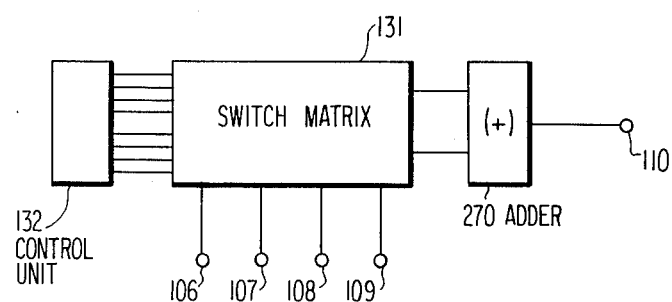
FIG. 15 is a block diagram of a code converting circuit of the fourth embodiment.

A fourth embodiment of this invention will be described with reference to FIGS. 2, 14 and 15. FIG. 14 and 15 show the details of the line circuits 101–104 and the code converting circuit 105 of this embodiment, respectively. The line circuit of FIG. 14 is similar in its circuit arrangement to the line circuit of FIG. 3 except that the Exclusive OR circuit 121 of FIG. 3 is replaced by a digital subtractor 260 mentioned hereinafter. The digital subtractor 260 has a positive input terminal (+) receiving a digital signal and a negative input terminal (−) receiving a digital signal. An N-bit digital signal given to the negative input terminal is subtracted from an (N+1)-bit digital signal by the digital substrator 260, the most significant bit of which assumes the logical level "1" and the lower N bits are supplied over the common bus from the code converter. The digital subtractor 260 produces, as an output signal, N bits of the subtraction result thus obtained. The code converting circuit of FIG. 15 is arranged by substituting a digital adder 270 described hereinafter for the Exclusive OR circuit 130 in the code converting circuit of FIG. 4. Other configurations of FIG. 15 are identical to those of FIG. 4. The digital adder 270 is an arithmetic unit in which two N-bit digital signals given to the two input terminals thereof are added to each other and lower N bits of the addition result are derived as an output signal from the digital adder.

Next, the communication between the line circuits 101 and 102 of FIG. 2 will be described in the case of this embodiment. In this embodiment, the respective gates in the line circuits 101~104 and the code converting circuit 105 are controlled in a manner similar to the first embodiment. Namely, the N-bit digital signals A and B transmitted from the line circuits 101 and 102 are supplied to the digital adder 270 of FIG. 15 at a certain time slot T. If it is now assumed that in the above explanation N is equal to 4, A is equal to "1100" and B is equal to "0111", then the digital adder 270 transmits lower four bits "0011" of the addition result "10011" as the third digital signal C to the common bus 113. The third digital signal signal C is sent to the line circuit 101 at the time slot T, which is similar to the first embodiment. The digital subtractor 260 of FIG. 14 produces a five-bit digital signal "10011", the lower four bits of which are formed by the above-mentioned digital signal C of "0011" given to the positive input terminal (+) and the most significant bit of which assumes the logical level "1". In the digital subtractor 260, the digital signal A of "1100" is subtracted from the five-bit digital signal "10011" and the digital subtractor 260 produces the lower four bits "0111" of the subtraction result "00111", as the digital signal B given from the line circuit 102 to the modem 120. In such a manner, the line circuit 102 reproduces the digital signal A given from the line circuit 101.

Figure 16:
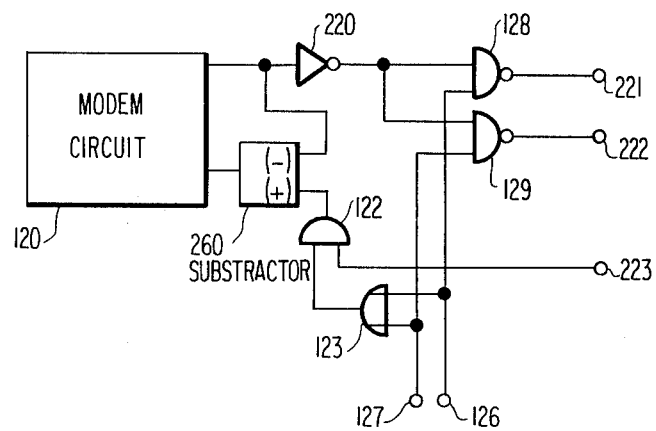
FIG. 16 is a logic diagram of a line circuit of a fifth embodiment of the invention.
Figure 17:
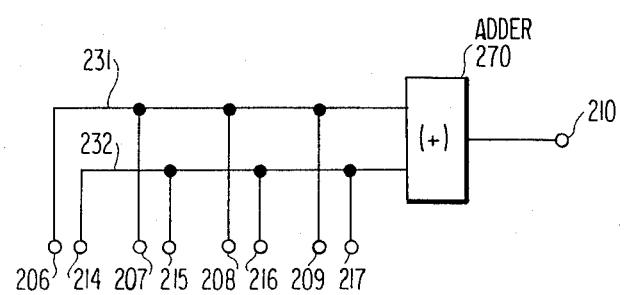
FIG. 17 is a logic diagram of a code converting circuit of the fifth embodiment.

A fifth embodiment will be described in connection with FIGS. 7, 16 and 17. FIGS. 16 and 17 show the details of the line circuits 201–204 and the code converting circuit 205 of FIG. 7 for use in this fifth embodiment. In the line circuit of FIG. 16, the Exclusive OR circuit 121 in the line circuit of FIG. 8 is replaced by the digital subtractor 260 of the fourth embodiment, and the other configuration of the line circuit of FIG. 16 is the same as that of FIG. 8. The code converting circuit of FIG. 17 is so arranged that the Exclusive OR circuit 230 in the code converting circuit of FIG. 9 is substituted by the digital adder 270 of the fourth embodiment, and there are no changes in this circuit configuration. In this fifth embodiment, the transmission and reception are performed at the same time slot between two line circuits perticipating in one communication in a manner similar to the second embodiment, and the code conversion is performed by the code converting circuit in a manner like the fourth embodiment. In addition, code inverse-conversions are performed by the respective line circuit, and thereby the transmitting digital signal from the line circuit on the other side is reproduced.

As mentioned above, the present system is capable of achieving bilateral communication at only one time slot.

Next, description will be made of embodiments of this invention in the case of the communication between the groups. A sixth embodiment will be described with reference to FIGS. 18, 3, 19 and 20.

Figure 18:
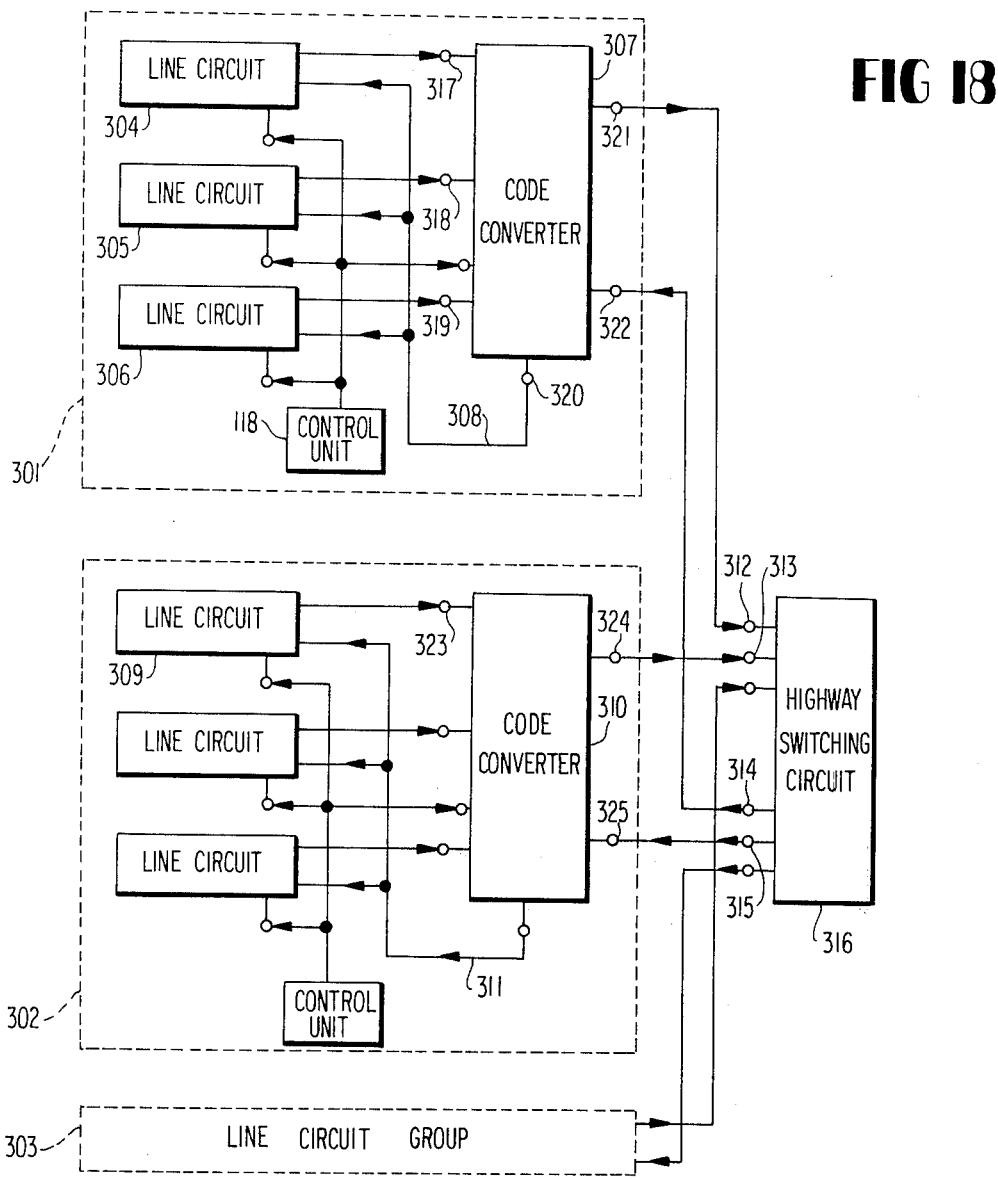
FIG. 18 is a block diagram of a sixth embodiment of the invention.

The present system of this invention shown in FIG. 18 comprises a group 301 having line circuits 304, 305 and 306, a code converting circuit 307 having three input terminals 317, 318 and 319 connected to the output terminals of the line circuits 304–306, a common bus 308 connecting one output terminal 320 of the code converting circuit 307 with all of the input terminals of the line circuits 304, 305 and 306 and the control unit 118, groups 302 and 303 having the same configuration as the group 301, respectively, and a highway switching circuit 316 having input terminals 312 and 313 connected to the other output terminals 321 and 324 of the code converting circuit 307 and 310 and having output terminals 314 and 315 connected to the other input terminals 322 and 325 of the respective code converting circuit. Also, the control unit 118 controls the line circuits and the code converting circuit in a way similar to the first embodiment.

The line circuits 304–306 and 309 have the circuit arrangement of FIG. 3. The output terminals 124 of the respective line circuits are connected to the input terminals such as the terminals 317–319 of the code converting circuit. The input terminals 125 of the respective line circuits are connected commonly to the output terminal 320 through the common bus 308.

Figure 19:
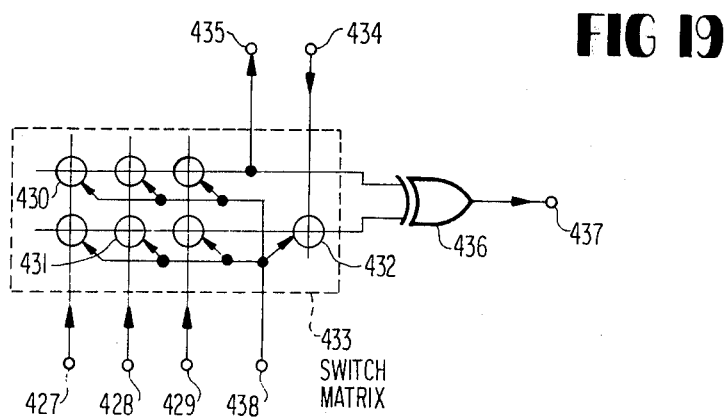
FIG. 19 is a logic diagram of a code converting circuit of the sixth embodiment.

Referring to FIG. 19, the code converting circuits 307 and 310 of FIG. 18 is composed of input terminals 427, 428 and 429 connected to the output terminals 124 of the line circuits in the respective groups, an input terminal 434 and an output terminal 435 connected to the output and input terminals of the highway switching circuit 316 of FIG. 18, an output terminal 437 connected to the common bus in the respective groups, an Exclusive OR circuit 436 having an output terminal connected to the output terminal 437, and a switch matrix 433 connected to the two input terminals of the Exclusive OR circuit 436 and to the terminals 427–429. The switch matrix 433 is composed of gates 430, 431 and 432 which are the same as the gates 133 and 134 of FIG. 4. A control signal is supplied to a terminal 438 of the switch matrix 433 controlled similarly to the switch matrix 131 of FIG. 4. The terminals 427, 428, 429, 434, 435 and 437 correspond to the terminals 317, 318, 319, 322, 321 and 320 in the group 301 of FIG. 18, respectively.

Figure 20:
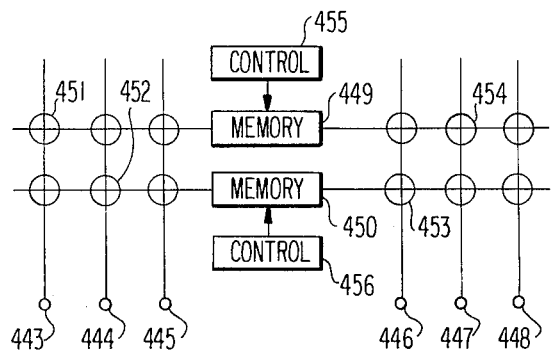
FIG. 20 is a logic diagram of a highway switching circuit of the sixth embodiment.

Referring to FIG. 20, the highway switching circuit 316 of FIG. 18 has input terminals 434, 444 and 445 which are connected to the output terminal 435 of the code converting circuit in each of the groups of FIG. 19 and output terminals 446, 447 and 448 connected to the input terminal 434 of each of the code convering circuits. In addition, the highway switching circuit includes memory units 449 and 450 having a plurality of memory cells, a gate group having gates 451, 452, 453 and 454 connecting the input portions of the memory units 449 and 450 with the input terminals 443, 444 and 445 and also connecting the output portions of the memory units 449 and 450 with the output terminals 446, 447 and 448, and control circuits 455 and 456 for controlling the memory units 449 and 450. The input terminals 443 and 444 correspond to the terminals 312 and 313 of FIG. 18, respectively, and the output terminals 446 and 447 correspond to the terminals 314 and 315, respectively.

First, the communication within the same group in this embodiment of this invention will be described. If the addresses of the two line circuits in one group are written in the control memory of the control unit 118 corresponding to the time slot T at which the communication is performed within the group, the control signal is not given to the gate 432 of FIG. 19 at the time slot T so that the gate 432 is in a closed condition. Consequently, in this embodiment, the communication within a group is performed in a manner similar to the first embodiment.

Next, the communication between the line circuits in different groups in the sixth embodiment, for example, between the line circuits 304 and 309 of FIG. 18 will be described. In the group 301, the addresses of the line circuit 304 and the highway switching circuit 316 are written in the control memory of the control unit 118 corresponding to the time slot $T_1$ at which the communication is performed between the groups. Then, the control signal is given to the line circuit 304 and the gate 432 of the highway switching circuit shown in FIG. 19 at the time slot $T_1$. In the group 302, similarly to the group 301, the control signal is transmitted to the line circuit 309 and the gate 432 of the code converting circuit 310 at the time slot $T_2$ selected independently of the time slot $T_1$. In this situation, the digital signal A is applied to the code converting circuit 307 from the line circuit 304 at the time slot $T_1$, and the digital signal B is sent to the code converting circuit 310 from the line circuit 309 at the time slot $T_2$. In the code converting circuit 307, the gates 430 and 432 of FIG. 19 are opened at the time slot $T_1$. As a consequence, said digital siganl A and the digital signal transmitted from the highway switching circuit 316 are given to the two input terminals of the Exclusive OR circuit 436. Also, the digital signal A of the line circuit 304 is derived from the terminal 435, that is, the terminal 321 of FIG. 18, and transferred to the terminal 312 of the highway switching circuit 316, i.e., the terminal 443 of FIG. 20. The gate 451 is opened at the time slot $T_1$ and thereby the digital signal A is stored in an allotted memory cell in the memory unit 449. Similarly, the gates 430 and 432 of the code converting circuit 310 of FIG. 19 are opened at the time slot $T_2$. As a result, the digital signal B is given to the Exclusive OR circuit 436 of the code converting circuit 310 from the line circuit 309. This digital B is also derived from the terminal 435, i.e., the terminal 324 of FIG. 18. The digital signal B thus derived from the terminal 324 is applied to the terminal 313 of the highway switching circuit 316, i.e., the terminal 444 of FIG. 20. The gate 452 is opened at the time slot $T_2$ with the result that the digital signal B is written in an allotted memory cell in the memory unit 450. The digital signal B stored in the memory unit 450 at the time slot $T_2$ is read out under the control of the control circuit 456 at the time slot $T_1$ and thereby the gate 453 is opened. As a result, the digital signal B is further given to the terminal 446, i.e., the terminal 314 in the highway switching circuit 316. In the code converting circuit 307 in the group 301, the digital signal B, which is fed through the terminal 314 of the highway switching circuit 316 and the terminal 322, i.e., the input terminal 434 of FIG. 19, is further given to the Exclusive OR circuit 436 through the gate 432 opened at the time slot $T_1$. In this way, the two digital signals A and B given to the Exclusive OR circuit 436 at the time slot $T_1$ are converted to the third digital signal $C = A \oplus B$ by this Exclusive OR circuit 436. The third digital signal C is distributed to the line circuit 304 through the common bus 308. In a similar way, the digital signal A stored in the memory unit 449 at the time slot $T_1$ is read out under the control of the control circuit 455 at the time slot $T_2$ and thereby the gate 454 is opened to produce the digital signal A from the terminal 447, i.e., the terminal 315 of the highway switching circuit 316.

In like manner, the code converting circuit 310 receives the digital signal A given from the line circuit 304 and the digital signal B given from the line circuit 309 at the time slot $T_2$ and converts these digital signals A and B into the third digital signal $C = A \oplus B$, which is distributed to the line circuit 309 through the common bus 311. The line circuits 304 and 309 reproduce the digital signal transmitted from the line circuit on the other side in a way similar to the case of the group communication within the same group.

Figure 21:
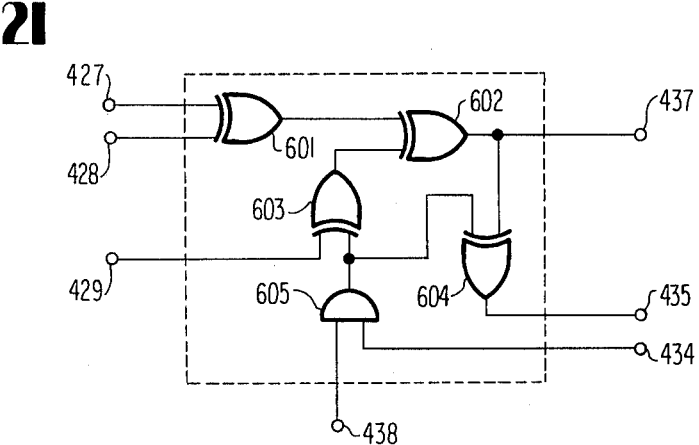
FIG. 21 is a logic diagram of another example of the code converting circuit of the sixth embodiment.

Referring to FIG. 21, another example of the code converting circuit of the sixth embodiment is composed of Exclusive OR circuits 601, 602, 603 and 604 and an AND gate 605.

Figure 22:
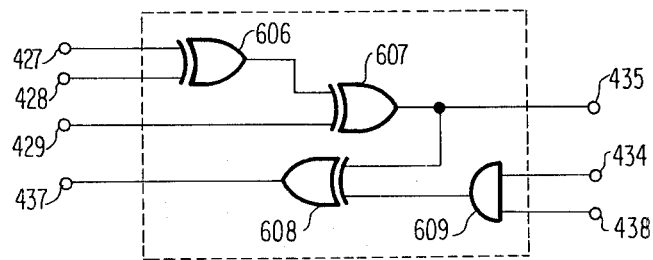
FIG. 22 is a logic diagram of a further example of the code converting circuit of the sixth embodiment.

Referring to FIG. 22, a further example of the code converting circuit of this embodiment includes Exclusive OR circuits 606, 607 and 608 and an AND gate 609.

In these code converting circuits of FIGS. 21 and 22, a terminal 438 receives the control signal having the logical level "0" in the case of the communication within a group, and as a result, the Exclusive OR output between the digital signals transmitted from two line circuits is derived from a terminal 437. In contrast, the terminal 438 receives the control signal having the logical level "1" in the case of the communication between two groups. Consequently, the digital signal given from a line circuit within a group is derived from a terminal 435 and the Exclusive OR output signal between the digital signals given from the above-mentioned line circuit and a line circuit in another group.

Figure 23:
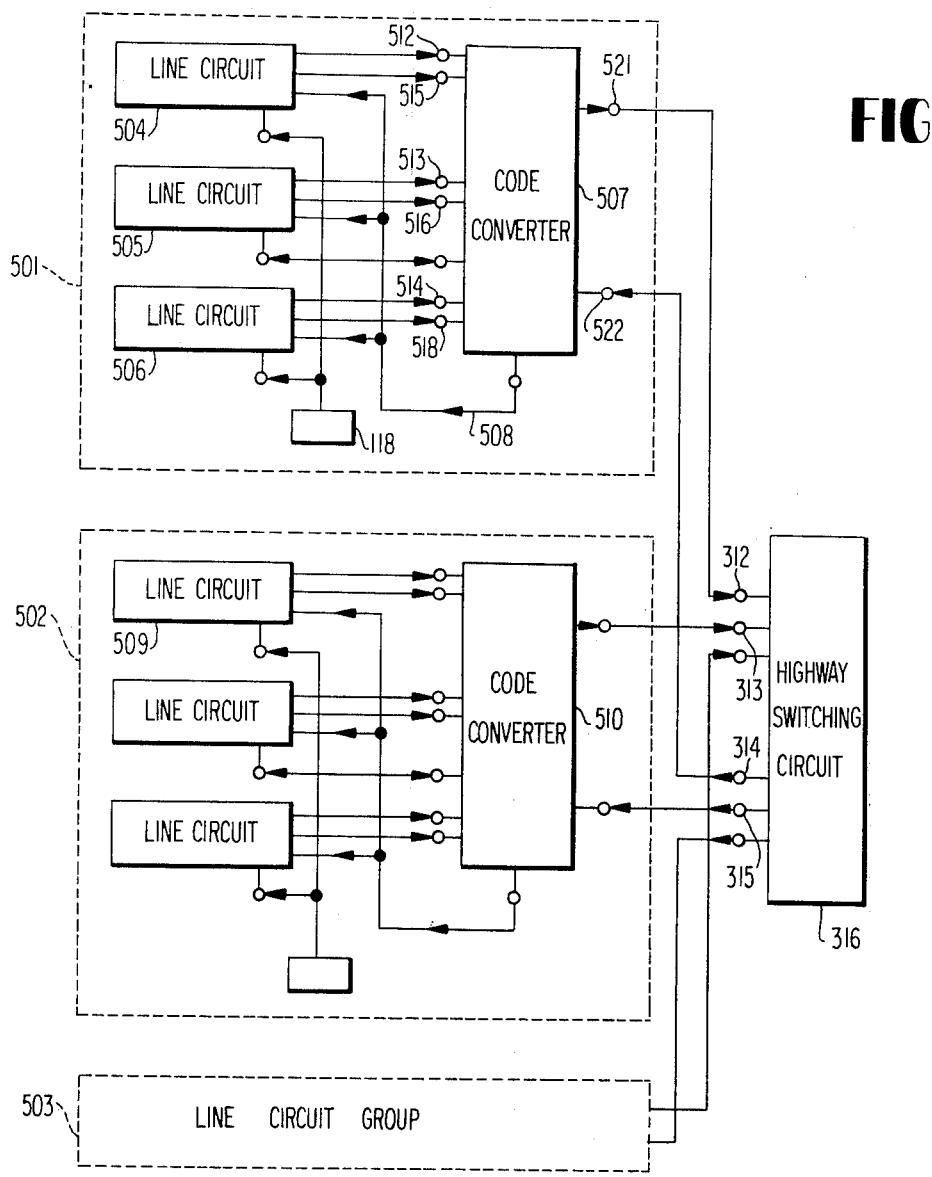
FIG. 23 is a block diagram of a seventh embodiment of the invention.

A seventh embodiment of this invention will be described in connection with FIGS. 23, 10, 20 and 24. The present system of FIG. 23 is comprised of a group 501 having line circuits 504, 505 and 506, a code converting circuit 507, a common bus 508 and the control unit 118, groups 502 and 503 having the same configuration as the group 501, respectively, and the highway switching circuit 316.

Figure 24:
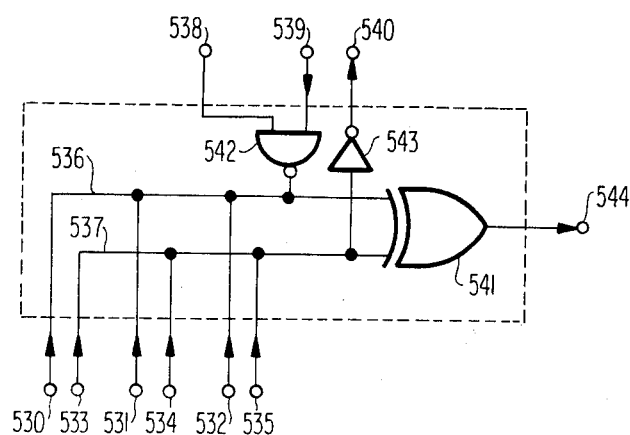
FIG. 24 is a logic diagram showing a code converting circuit of the seventh embodiment.

FIGS. 10, 20 and 24 show the details of the line circuit, the highway switching circuit and the code converting circuit of this seventh embodiment, respectively. The line circuit of FIG. 10 is identical to the line circuit of the second embodiment. The highway switching circuit of FIG. 20 is the same as that of the sixth embodiment.

The code converging circuit of FIG. 24 is comprised of a first bus 536 and a second bus 537 connecting terminals 530-532 and terminals 533-535 in common, respectively, an Exclusive OR circuit 541 having input terminals connected these buses 536 and 537 and an output terminal connected to a terminal 544, an NAND gate 542 consisting of an open collector (or tristate) gate having input terminals connected to terminals 538 and 539 and an output terminal connected to the first bus 536, and an inverter 543 having an input terminal connected to the second bus 537 and an output terminal connected to a terminal 540. The terminals 530-535, 539, 540 and 533 correspond to the terminals 512-514, 515-517, 522, 521 and 520 of FIG. 23. The terminal 538 is connected to the output terminal of the control unit 118.

In the case of the communication within a group, the control signal applied to the terminal 538 assumes the logical level "0" to obtain the logical level "1" from the NAND gate 542. Accordingly, the Exclusive OR circuit 541 receives the inverted signals $\overline{A}$ and $\overline{B}$ corresponding to the digital signals A and B given from the two line circuits within a group at the same time slot, like the second embodiment, and then produces an Exclusive OR output signal $A \oplus B$ at the terminal 544. The above-mentioned line circuits receive this Exclusive OR output signal $A \oplus B$ at the above-mentioned time slot to reproduce the digital signal given from the line circuit on the other side, respectively.

Now, the communication between groups will be described by way of an example of the communication between the line circuits 504 and 509 of FIG. 23. In the line circuit 504, the transmitting NAND gate 129 is opened by the control signal given from the control unit 118 at the time slot T so that the inverted signal $\overline{A}$ of the digital signal A is produced. This digital signal $\overline{A}$ is applied to the terminal 515 of FIG. 23, i.e., the terminal 533 of FIG. 24 and then given to the inverter 543 through the second bus 537. The digital signal $\overline{A}$ is inverted by the inverter 543 and the thus inverted digital signal A is fed to the terminal 540. This digital signal A thus given to the terminal 540 is further sent to the highway switching circuit 316.

On the other hand, the digital signal B given from the line circuit 509 is fed to the highway switching circuit 316 in like manner and then sent to the terminal 539 of FIG. 24 at the time slot T in a manner similar to the sixth embodiment. In this situation, the NAND gate 542 is opened by the control signal transmitted to the terminal 538 with the result that the inverted signal $\overline{B}$ corresponding to the transmitting digital signal B is supplied to the first bus 536. The Exclusive OR circuit 541 receives the inverted digital signals $\overline{A}$ and $\overline{B}$ through the buses 536 and 537 to produce the Exclusive OR output signal $A \oplus B$ at the terminal 544.

The line circuit 504 reproduces the digital signal B given from the line circuit 509 in a manner similar to the case of the communication within a group. The line circuit 509 also reproduces the digital signal A given from the line circuit 504 in like manner.

Figure 25:
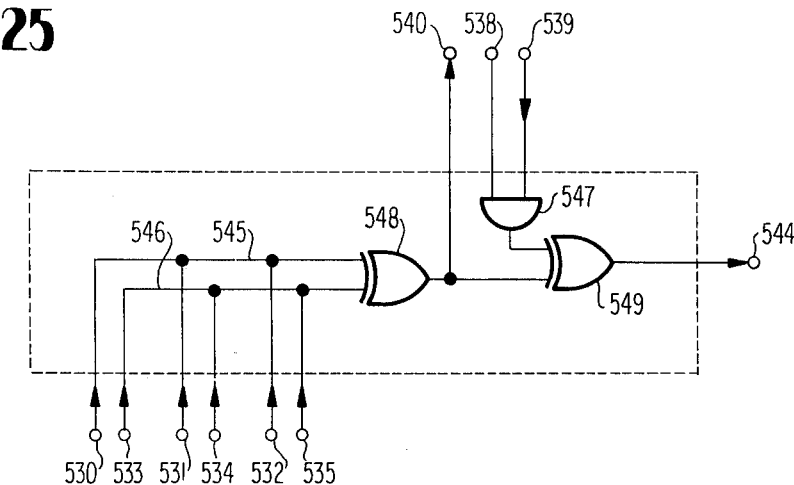
FIG. 25 is a logic diagram of another example of the code converting circuit of the seventh embodiment.

Referring to FIG. 25, another example of the code converting circuit of this seventh embodiment is composed of a first bus 545, a second bus 546, and AND gate 547 and Exclusive OR circuits 548 and 549.

Figure 26:
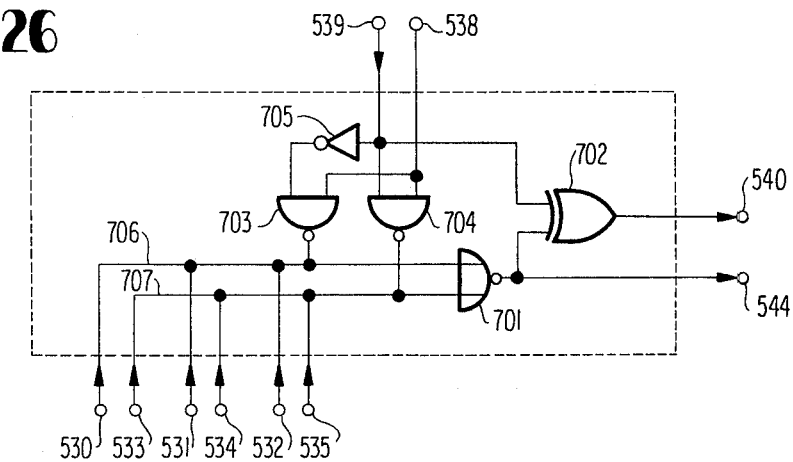
FIG. 26 is a logic diagram of a first example of a code converting circuit of an eighth embodiment of the invention.

An eighth embodiment of this invention will be described referring to FIGS. 23, 11, 20 and 26. FIGS. 11, 20 and 26 show the details of the line circuit, the highway switching circuit and the code converting circuit, respectively. The line circuit of FIG. 11 is the same as the line circuit of the third embodiment. The highway switching circuit of FIG. 20 is identical to the highway switching circuit of the sixth embodiment. In the group 501 of FIG. 23, the first and second output terminals 221 and 222 of the line circuit of FIG. 11 are connected to the terminals 512, 513 and 514 and the terminals 515, 516 and 517 of FIG. 23, respectively, and the input terminal 223 of FIG. 11 is connected to the terminal 520 of FIG. 23 through the common bus 508 of FIG. 23.

Referring to FIG. 26, a first example of the code converting circuit of this eighth embodiment has terminals 530-532 and 533-535 connected to the output terminals of the first and second transmitting NAND gates in the line circuit, a terminal 539 receiving the digital signal from the highway switching circuit 316, a terminal 540 for transmitting the digital signal to the highway switching circuit 316, a terminal 544 connected to the common bus in a group and a terminal 538 connected to the control unit 118, and said code converting circuit is composed of a first bus 706 and a second bus 707 connecting the terminals 530–532 and 533–535 in common, respectively, an inverter 705, an open collector (or tristate)-type NAND gate 704 having an input terminal connected to the terminal 539 and an output terminal connected to the second bus 707, an open collector (or tristate) type NAND gate 703 having an input terminal connected to the terminal 539 through the inverter 705 and an output terminal connected to the first bus 706, a NOR gate 701 having input terminals connected to the first and second buses 706 and 707 and an output terminal connected to the terminal 544, and an Exclusive OR circuit 702 having input terminals connected to the output terminal of the NOR gate 701 and the terminal 539 and an output terminal connected to the terminal 540.

In the case of the communication within a group, the control signal given to the terminal 538 has the logical level "0", and then this communication is performed in a way similar to the third embodiment. In the case of the communication between groups, the digital signal A and its inverted signal $\overline{A}$ with respect to the line circuit in one group are applied through the terminals 530–532 and 533–535 on the side of the line circuit, respectively. On the other hand, the digital signal B given from the line circuit in the other group is supplied to the terminal 539 through the highway switching circuit 316, as described in conjunction with the sixth embodiment. In this situation, the control signal having the logical level "1" is given to the terminal 538 so as to produce the digital signals B and $\overline{B}$ from the NAND gate 703 and 704. As a result, the first and second buses 706 and 707 assume the logical levels corresponding to the logical products $A \cdot B$ and $\overline{A} \cdot \overline{B}$, respectively, since these buses form a wired logic configuration. Accordingly, the OR gate 701 produces the digital signal $A \oplus B$ ($=\overline{A \cdot B} + \overline{A \cdot B}$) at the terminal 544. The Exclusive OR circuit 702 produces the digital signal A ($=(A \oplus B) \oplus B$) given from the line circuit within the group at the terminal 540. Then the line circuits reproduce the digital signal given from the other line circuits in a manner similar to the third embodiment.

Figure 27:
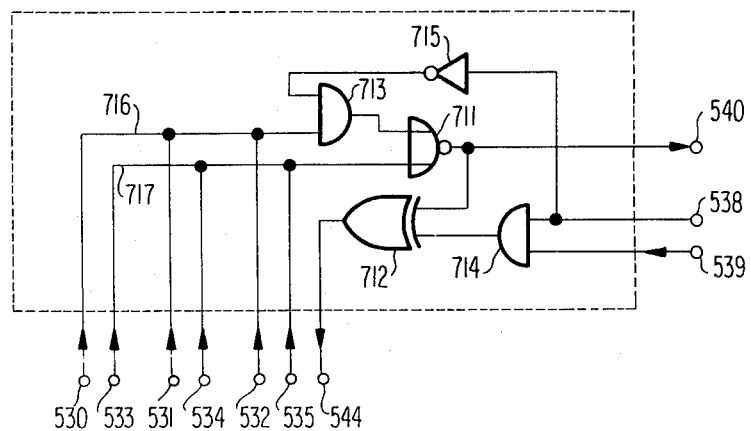
FIG. 27 is a logic diagram of a second example of the code converting circuit of the eighth embodiment.

Referring to FIG. 27, a second example of the code converting circuit of the eighth embodiment is composed of a first bus 716, a second bus 717, a NOR gate 711, AND gates 713 and 714, an inverter 715 and an Exclusive OR circuit 712.

Figure 28:
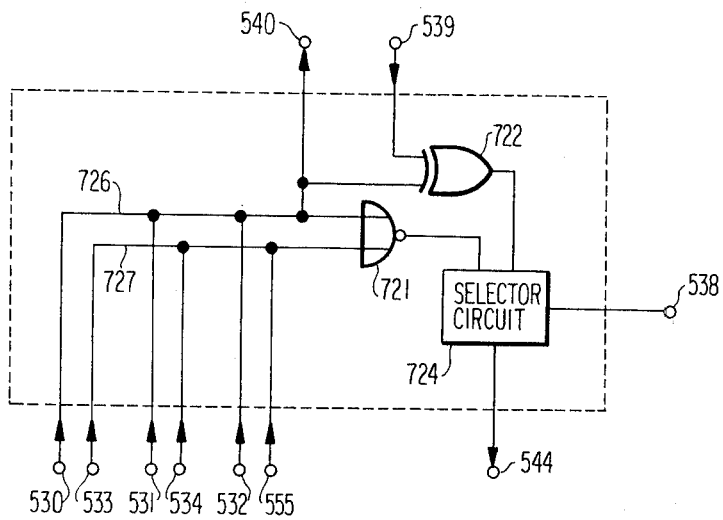
FIG. 28 is a logic diagram of a third example of the code converting circuit of the eighth embodiment.

Referring to FIG. 28, a third example of the code converting circuit of this embodiment includes a first bus 726, a second bus 727, a NOR gate 721, an Exclusive OR circuit 722, and a selector circuit 724 receiving a selecting signal from the terminal 538 for producing the output signal from the NOR gate 721 at the terminal 544 in the case of the communication within a group and for producing the output signal from the Exclusive OR circuit 722 at the terminal 544 in the case of the communication between groups.

Figure 29:
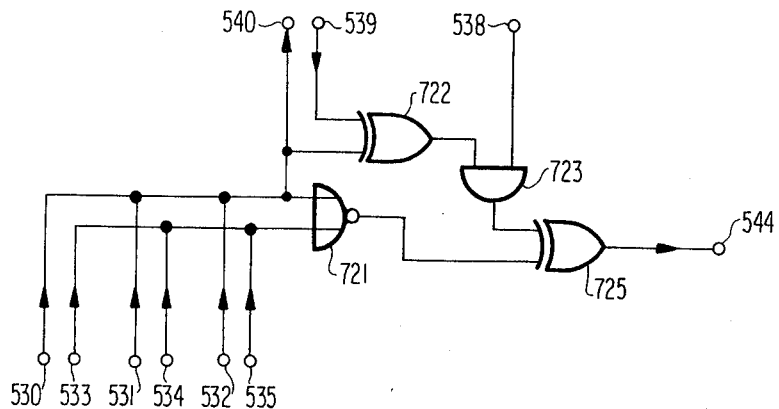
FIG. 29 is a logic diagram of a fourth example of the code converting circuit of the eighth embodiment.

FIG. 29 shows a fourth example of the code converting circuit of this embodiment. This code converting circuit consists of a NOR gate 721, an AND gate 723, and Exclusive OR circuits 722 and 725.

Moreover, the NOR gates 701, 711 and 721 used in the code converting circuit of this embodiment may be replaced by the logic circuit consisting of the Exclusive OR circuit 253 and the inverter 254.

Figure 30:
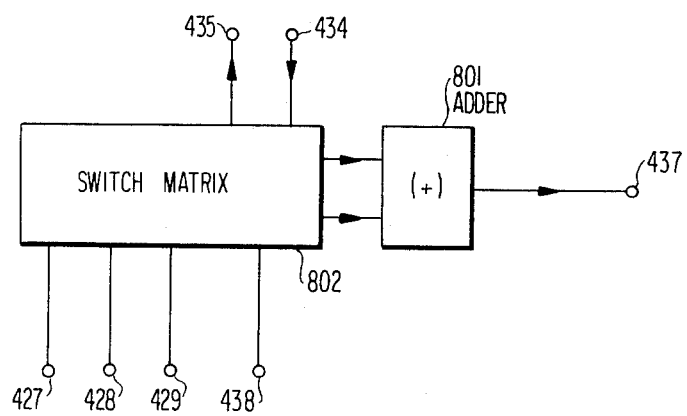
FIG. 30 is a block diagram of a code converting circuit of a ninth embodiment of the invention.

A ninth embodiment will be described with reference to FIGS. 18, 14, 20 and 30. FIGS. 14, 20 and 30 show the details of the line circuit, the highway switching circuit and the code converting circuit, respectively. The line circuit of FIG. 14 is the same as the line circuit of the fourth embodiment. The highway switching circuit of FIG. 20 is the same as the highway switching circuit of the sixth embodiment. The code converting circuit of FIG. 30 is composed of a digital adder 801 having the same configuration as the digital adder 270 in the code converting circuit of FIG. 15 for use in the fourth embodiment, and a switch matrix 802 having the same arrangement as the switch matrix 433 in the code converting circuit of FIG. 19 for use in the sixth embodiment.

In the ninth embodiment, the communication is performed by controlling the line circuit of FIG. 18, the code converting circuit and the highway switching circuit in a manner similar to the sixth embodiment. In this embodiment, the code conversion by the code converting circuit and the code inverse-conversion by the line circuit are the same as the code conversion and the code inverse-conversion in the fourth embodiment.

Figure 31:
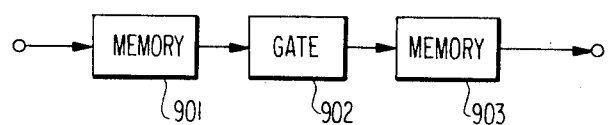
FIG. 31 is a block diagram of a highway switching circuit of the sixth through ninth embodiments.

In addition, the highway switching circuit in the form of the gate-memory-gate configuration of FIG. 20 with respect to the sixth, seventh, eighth and ninth embodiments is a mere illustration of the highway switching circuit 316 of FIGS. 18 and 23, which does not limit the structure of the highway switching circuit. For example, as an alternative to the highway switching circuit, a conventional memory-gate-memory configuration composed of memory circuits 901 and 903 and a gate circuit 902 as shown in FIG. 31 may be adopted.

As mentioned above, this invention makes a bilateral communication possible using only one time slot in the case of the communication within a group while allowing the communication between groups.

The present system can double the degree of multiplexing of communications compared with the conventional systems with respect to the communication within the same common bus, if the degree of multiplexing of the common bus in the present system is the same as that in the conventional systems. As a result, this invention greatly contributes to the simplification and cost reduction of the system, without sacrificing the efficiency.

What is claimed is:

1. A time division digital switching system comprising:
   a plurality of line circuits;
   a code converting circuit for receiving first and second digital signals transmitted from two line circuits of said plurality of line circuits, said two line circuits participating in a communication, said code converting circuit producing a third digital signal indicating the mutual relationship between said first and second digital signals;
   a common bus for distributing said third digital signal given from said code converting circuit to each of said plurality of line circuits;
   a control memory for storing a plurality of address pairs, one of said address pairs corresponding to said two line circuits participating in said communication;

control means for writing the address pair of said two line circuits participating in the communication into said control memory in response to the initiation of the communication, for reading out each of the address pairs stored in said control memory periodically, and for allotting one time slot to said two line circuits so that information is interchanged periodically between said two line circuits participating in said communication by said one address pair derived periodically from said control memory; and a code inverse-converting circuit provided in each of said plurality of line circuits and receiving said third digital signal distributed from said code converting circuit and the digital signal given from the corresponding line circuit for reproducing the digital signal relating to another line circuit identified by one of said address pairs.

2. A time division digital switching system as claimed in claim 1, wherein said code converting circuit comprises a plurality of input terminals connected respectively to the output terminals of said line circuits, an Exclusive OR circuit having two input terminals and an output terminal connected to said common bus, a switch matrix for connecting said plurality of input terminals with said two input terminals of said Exclusive OR circuit, and a control unit for controlling said switch matrix to transmit said first and second digital signals to each of said two input terminals of said Exclusive OR circuit respectively during said allotted one time slot; wherein said third digital signal is composed of an Exclusive OR output signal between said first and second digital signals; and wherein said code inverse-converting circuit is composed of an Exclusive OR circuit.

3. A time division digital switching system as claimed in claim 1, wherein said line circuits have first and second output terminals, respectively, wherein said code converting circuit comprises first and second buses connecting said first and second output terminals of said line circuits in common, respectively, and an Exclusive OR circuit having two input terminals connected to said first and second buses and an output terminal connected to said common bus; wherein said third digital signal is an Exclusive OR output between said first and second digital signals; and wherein said code inverse-converting circuit is composed of an Exclusive OR circuit.

4. A time division digital switching system as claimed in claim 1, wherein said code converting circuit comprises a logic circuit having a plurality of input terminals connected respectively to the output terminals of said line circuits, and a plurality of Exclusive OR circuits; wherein each of said plurality of input terminals is connected to an input terminal of one of said plurality of Exclusive OR circuits; said plurality of Exclusive OR circuits being connected in a multistage form so that the final stage has only one Exclusive OR circuit; the output terminal of said final stage Exclusive OR circuit forms the output terminal of said code converting circuit; wherein said output terminal is connected to said common bus; and wherein said code inverse-converting circuit is composed of an Exclusive OR circuit.

5. A time division digital switching system as claimed in claim 1, wherein said line circuits have first and second output terminals, respectively, a first transmitting gate for producing at said first output terminal of said two output terminals the logical level "1" in the case of non-communication and a transmitting digital signal in the case of communication, and a second transmitting gate for producing at said second output terminal the logical level "1" in the case of non-communication and an inverted signal corresponding to said transmitting digital signal in the case of communication; wherein said code converting circuit is composed of a first bus connecting all of said first output terminals in said line circuits, a second bus connecting all of said second output terminals in said line circuits, and a logic circuit having two input terminals connected to said first and second buses for producing on said common bus the logical level "1" when both of said two input terminals have the logical level "0", the logical level "0" when either one of said two input terminals has the logical level "1" and the logical level "1" or "0" when both of said two input terminals have the logical level "1"; and wherein said code inverse-converting circuit is composed of an Exclusive OR circuit.

6. A time division digital switching system as claimed in claim 1, wherein said code converting circuit comprises a plurality of input terminals connected respectively to the output terminals of said line circuits, a digital adder having two input terminals receiving said first and second digital signals each having N bits, respectively, and an output terminal connected to said common bus for producing the lower N bits other than the most significant bit of (N+1) bits which are an addition result between said first and second digital signals as said third digital signal, a switch matrix for connecting a plurality of input terminals connected respectively to the output terminals of said line circuits with said two input terminals of said digital adder, and a control unit for controlling said switch matrix to transmit said first and second digital signals to each of said two input terminals of said digital adder respectively during said allotted one time slot; and wherein said code inverse-converting circuit is composed of a digital subtractor receiving a digital signal having (N+1) bits composed of the most significant bit and the lower N bits in which said most significant bit is "1" and the lower N bits correspond to said third digital signal and the digital signal having N bits transmitted from the corresponding line circuit for subtracting said digital signal having N bits transmitted from the corresponding line circuit from said digital signal having (N+1) bits thereby producing the lower N bits other than the most significant bit of (N+1) bits which are a subtraction result.

7. A time division digital switching system as claimed in claim 1, wherein said line circuits have first and second output terminals, respectively, wherein said code converting circuit comprises first and second buses for connecting said first and second output terminals of said line circuits in common, respectively, and a digital adder having two input terminals connected to said first and second buses for receiving said first and second digital signals having N bits, respectively, and an output terminal connected to said common bus for producing the lower N bits other than the most significant bit of (N+1) bits which are an addition result between said first and second digital signals as said third digital signal; and wherein said code inverse-converting circuit is composed of a digital subtractor for receiving a digital signal having (N+1) bits composed of the most significant bit and the lower N bits in which said most significant bit is "1" and the lower N bits correspond to said third signal and the digital signal having N bits transmitted from the corresponding line circuit for subtracting said digital signal having N bits transmitted from the corresponding line circuit from said digital signal having (N+1) bits thereby producing the lower N bits other than the most significant bit of (N+1) bits which are a subtraction result.

8. A time division digital switching system comprising: a plurality of line circuit groups; and a highway switching circuit having a plurality of input terminals and output terminals corresponding to said line circuit groups, respectively, wherein each of said line circuit groups includes:

a plurality of line circuits;

a code converting circuit for receiving first and second digital signals participating in a communication and transmitted from said line circuits or said highway switching circuit, for producing a third digital signal indicating the mutual relationship between said first and second digital signals and for supplying a digital signal given from a line circuit within the same one of said plurality of line circuit groups to said input terminal of said highway switching circuit in the case of a communication between line circuit groups;

a common bus for distributing said third digital signal derived from said code converting circuit to said respective line circuits within said one of said plurality of line circuit groups;

a control memory having a plurality of first address pairs, one of said first address pairs corresponding to two line circuits participating in the case of communication within said one of said plurality of line circuit groups, a plurality of second address pairs, one of each second address pair corresponding to an address with respect to one line circuit within a line circuit group to which said line circuit belongs and the other one of said address pair corresponding to an address with respect to said highway switching circuit in the case of communication between line circuit groups;

control means for writing said first or second address of said pair into said control memory in response to the initiation of each communication, for reading out said first or second address of said pair out of said control memory periodically, and for allotting one time slot to said two line circuits in the case of communication within one of said line circuit groups and to one line circuit and said highway switching circuit in the case of communication between line circuit groups, respectively, so that information for the communication between said two line circuits participating in said communication within one of said line circuit groups and said communication between said line circuit groups is interchanged periodically by an address pair derived periodically from said control memory; and a code inverse-converting circuit provided in each of said line circuits for receiving said third digital signal distributed from said code converting circuit and the digital signal given from the corresponding line circuit and for reproducing the digital signal given from another line circuit identified by one of said address pairs.

9. A time division digital switching system as claimed in claim 8, wherein said code converting circuit has a plurality of input terminals connected respectively to the output terminals of said line circuits, another input terminal connected to the output terminal of said highway switching circuit, an output terminal connected to said common bus, another output terminal connected to the input terminal of said highway switching circuit, an Exclusive OR circuit having two input terminals and having an output terminal connected to said output terminal connected to said common bus, a switch matrix for connecting said plurality of input terminals and said another input terminal with the input terminals of said Exclusive OR circuit and said another output terminal, and a control unit for controlling said switch matrix to transmit said first and second digital signals to each of said two input terminals of said Exclusive OR circuit respectively during said allotted one time slot; and wherein said code inverse-converting circuit is composed of an Exclusive OR circuit.

10. A time division digital switching system as claimed in claim 8, wherein said line circuits have first and second output terminals, respectively, wherein said code converting circuit comprises first and second buses for connecting said first and second output terminals of said line circuits in common, respectively, an Exclusive OR circuit having two input terminals connected to said first and second buses and an output terminal connected to said common bus, a first logic element for supplying the digital signal given from said highway switching circuit to either one of said first bus and said second bus, and a second logic element for supplying the digital signal on the other one of said second bus and said first bus to said highway switching circuit; and wherein said code inverse-converting circuit is composed of an Exclusive OR circuit.

11. A time division digital switching system as claimed in claim 8, wherein said line circuits have first and second output terminals, respectively, wherein said code converting circuit comprises first and second buses for connecting said first and second output terminals of said line circuits in common, respectively, a first Exclusive OR circuit having input terminals connected to said first and second buses, respectively, and an output terminal connected to the input terminal of said highway switching circuit, and a second Exclusive OR circuit having input terminals connected to the output terminal of said first Exclusive OR circuit and the output terminal of said highway switching circuit and an output terminal connected to said common bus; and wherein said code inverse-converting circuit is composed of an Exclusive OR circuit.

12. A time division digital switching system as claimed in claim 8, wherein said code converting circuit comprises a logic circuit having a plurality of input terminals connected respectively to the output terminals of said line circuits within said group and a plurality of first Exclusive OR circuits, and a second Exclusive OR circuit having one input terminal connected to the output terminal of said logic circuit and another input terminal connected to the output terminal of said highway switching circuit; wherein each of said plurality of input terminals is connected to an input terminal of one of said plurality of first Exclusive OR circuits; wherein said plurality of first Exclusive OR circuits are connected in a multi-stage form so that the final stage has only one first Exclusive OR circuit; wherein the output terminal of said final stage of the first Exclusive OR circuit forms the output terminal of said logic circuit; wherein said output terminal is connected to the input terminal of said highway switching circuit; wherein said common bus connects the output terminal of said second Exclusive OR circuit with all of the input terminals of said line circuits; and wherein said code inverse-converting circuit is composed of an Exclusive OR circuit.

13. A time division digital switching system as claimed in claim 8, wherein said code converting circuit comprises a logic circuit having a plurality of input terminals connected to respective ones of the output terminals of said line circuits within said group and the output terminal of said highway switching circuit, a plurality of first Exclusive OR circuits, a second Exclusive OR circuit having one input terminal connected to the output terminal of said logic circuit, another input terminal connected to the output terminal of said highway switching circuit and an output terminal connected to the input terminal of said highway switching circuit; wherein each of said plurality of input terminals is connected to an input terminal of one of said plurality of first Exclusive OR circuits; wherein said plurality of first Exclusive OR circuits are connected in a multistage form so that the final stage has only one first Exclusive OR circuit; wherein the output terminal of said final stage of the first Exclusive OR circuit forms the output terminal of said code converting circuit; wherein said common bus connects the output terminal of said logic circuit with all of the input terminals of said line circuits; and wherein said code inverse-converting circuit is composed of an Exclusive OR circuit.

14. A time division digital switching system as claimed in claim 8, wherein each of said plurality of line circuits has first and second output terminals, an input terminal, a first transmitting gate for supplying to said first output terminal the logic level "1" in the case of non-communication and the transmitting digital signal in the case of communication, and a second transmitting gate for supplying to said second output terminal of said line circuit the logical level "1" in the case of non-communication and an inverted signal corresponding to said transmitting digital signal in the case of communication, wherein said code converting circuit is composed of a first bus for connecting all of the first output terminals of said line circuits; a second bus for connecting all of the second output terminals of said line circuits; a gate circuit having an input terminal connected to the output terminal of said highway switching circuit; a first output terminal connected to said first bus and a second output terminal connected to said second bus; a first common bus transmitting gate for supplying to said first output terminal a logical level "1" in the case of the communication within a group and a digital signal of a line circuit in the other group participating in the communication which is applied to said input terminal in the case of the communication between groups, and a second common bus transmitting gate for supplying to said second output terminal a logical level "1" in the case of the communication within the group and an inverted signal corresponding to said digital signal in the case of the communication between the groups; a logic circuit having two input terminals connected to said first and second buses for producing the logical level "1" when both of said two input terminals have the logical level "0", a logic level "0" when either one of said two input terminals has the logical level "1" and the logical level "1" or "0" when both of said two input terminals have the logical level "1"; and an Exclusive OR circuit having two input terminals, one of which is connected to the output terminal of said logic circuit and the other of which is connected to said output terminal of said highway switching circuit and an output terminal connected to the input terminal of said highway switching circuit, wherein said common bus connects the output terminal of said logic circuit with all of the input terminals of said line circuits, and wherein said code inverse-converting circuit is composed of an Exclusive OR circuit.

15. A time division digital switching system as claimed in claim 8, wherein each of said plurality of line circuits has first and second output terminals, an input terminal, a first transmitting gate for supplying to said first output terminal the logical level "1" in the case of non-communication, and the transmitting digital signal in the case of communication and a second transmitting gate for supplying to said second output terminal the logical level "1" in the case of non-communication and an inverted signal corresponding to said transmitting digital signal; wherein said code converting circuit is provided in each of said groups and is composed of a first bus for connecting all of the first output terminals of said line circuits, a second bus for connecting all of the second output terminals of said line circuits, a first logic circuit having an input terminal connected to said first bus for producing the applied digital signal as it is in the case of the communication within a group and the logical level "0" in the case of the communication between groups, a second logic circuit having two input terminals connected to said second bus and the output terminal of said first logic circuit and an output terminal connected to the input terminal of said highway switching circuit for producing the logical level "1" when both of said two input terminals have the logical level "0", the logic level "0" when either one of said two input terminals has the logical level "1", and the logical level "1" or "0" when both of said two input terminals have the logical level "1", and a first Exclusive OR circuit having two input terminals, one of which is connected to the output terminal of said second logic circuit and the other of which is connected to the output terminal of said highway switching circuit; wherein said common bus connects the output terminal of said first Exclusive OR circuit with all of the input terminals of said line circuits; and wherein said code inverse-converting circuit is composed of an Exclusive OR circuit.

16. A time division digital switching system as claimed in claim 8, wherein each of said plurality of line circuits has first and second output terminals, an input terminal, a first transmitting gate for supplying to said first output terminal the logical level "1" in the case of non-communication and the transmitting digital signal in the case of communication, and a second transmitting gate for supplying to said second output terminal of said line circuit a logical level "1" in the case of non-communication and an inverted signal corresponding to said transmitting digital signal; wherein said code converting circuit is composed of a first bus for connecting all of the first input terminals of said line circuits and connected to the input terminal of said highway switching circuit, a second bus for connecting all of the second output terminals of said line circuits, a first logic circuit having two input terminals connected to said first and second buses for producing a logical level "1" when both of said two input terminals have the logical level "0", the logical level "0" when either one of said two input terminals has the logical level "1" and the logical level "1" or "0" when both of said two input terminals have the logical level "1", and a second logic circuit having a first input terminal connected to the output terminal of said first logic circuit, a second input terminal connected to said first bus and a third input terminal connected to the output terminal of said highway switching circuit for producing the signal applied to said first input terminal connected to the output terminal of said first logic circuit in the case of the communication within a group, and an Exclusive OR circuit having its inputs connected to said second and third input terminals for producing an output signal in the case of the communication between the groups; and wherein said common bus connects the output terminal of said second logic circuit with all of the input terminals of said line circuits; and wherein said code inverse-converting circuit is composed of an Exclusive OR circuit.

17. A time division digital switching system as claimed in claim 8, wherein said code converting circuit is composed of a plurality of input terminals connected respectively to the output terminals of said line circuits, another input terminal connected to the output terminal of said highway switching circuit, an output terminal connected to said common bus, another output terminal connected to the input terminal of said highway switching circuit, a digital adder having two input terminals receiving first and second digital signals having N bits, respectively, for producing the lower N bits other than the most significant bit of (N+1) bits which are an addition result between said first and second digital signals as a third digital signal at said output terminal connected to said common bus, a switch matrix for connecting said plurality of input terminals and said another input terminal with said two input terminals of said digital adder and said another output terminal, and a control unit for controlling said switch matrix to transmit said first and second digital signals to each of said two input terminals of said digital adder respectively during said allotted one time slot; and wherein said code inverse-converting circuit is composed of a digital subtractor receiving a digital signal having (N+1) bits composed of the most significant bit and the lower N bits in which said most significant bit is "1" and the lower N bits correspond to said third digital signal and the transmitting digital signal from the line circuit for subtracting said transmitting digital signal having N bits from the corresponding line circuit from said digital signal having (N+1) bits, thereby producing the lower N bits other than the most significant bit of (N+1) bits which are a subtraction result.

* * * * *

UNITED STATES PATENT AND TRADEMARK OFFICE
CERTIFICATE OF CORRECTION

PATENT NO. : 4,253,179

DATED : February 24, 1981

INVENTOR(S) : SHIMIZU

It is certified that error appears in the above—identified patent and that said Letters Patent is hereby corrected as shown below:

Column 4, line 33, after "slot" delete the period.

Column 5, line 12, after "and" insert -- then -- ;

line 35, after "respective" insert -- receiving -- ;

line 58, after "third" insert -- digital -- .

Column 6, line 37, after "The" and before "signal" insert -- digital -- .

Column 10, line 48, after "digital" insert -- signal -- .

Signed and Sealed this

Twenty-first Day of July 1981

[SEAL]

Attest:

GERALD J. MOSSINGHOFF

Attesting Officer      Commissioner of Patents and Trademarks